June 3, 1930.  B. T. WILKEY  1,760,891
COMBINED FOUR-WHEEL JACK AND SHOCK ABSORBER
Filed July 23, 1927  2 Sheets-Sheet 1
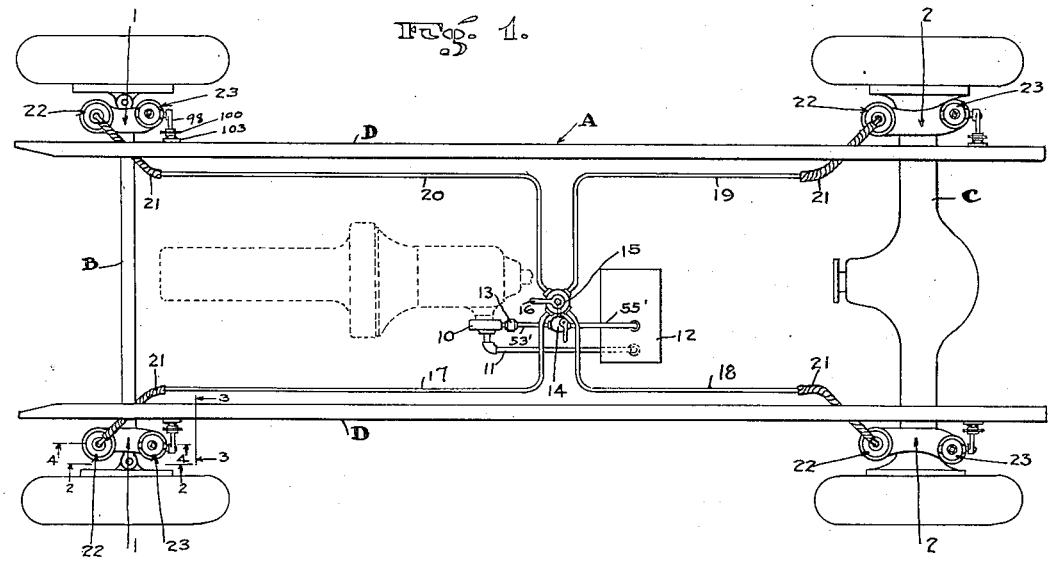
Fig. 1.
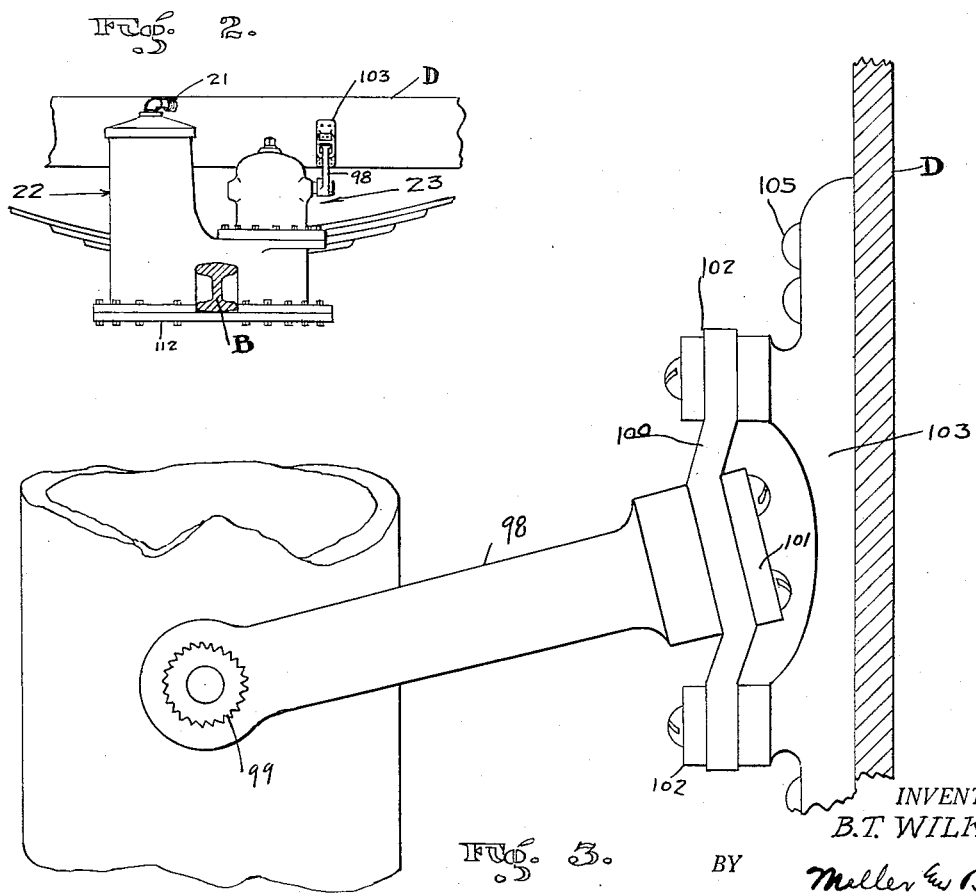
Fig. 2.
Fig. 3.
INVENTOR.
B. T. WILKEY
BY
ATTORNEYS.

June 3, 1930.  B. T. WILKEY  1,760,891
COMBINED FOUR-WHEEL JACK AND SHOCK ABSORBER
Filed July 23, 1927  2 Sheets-Sheet 2
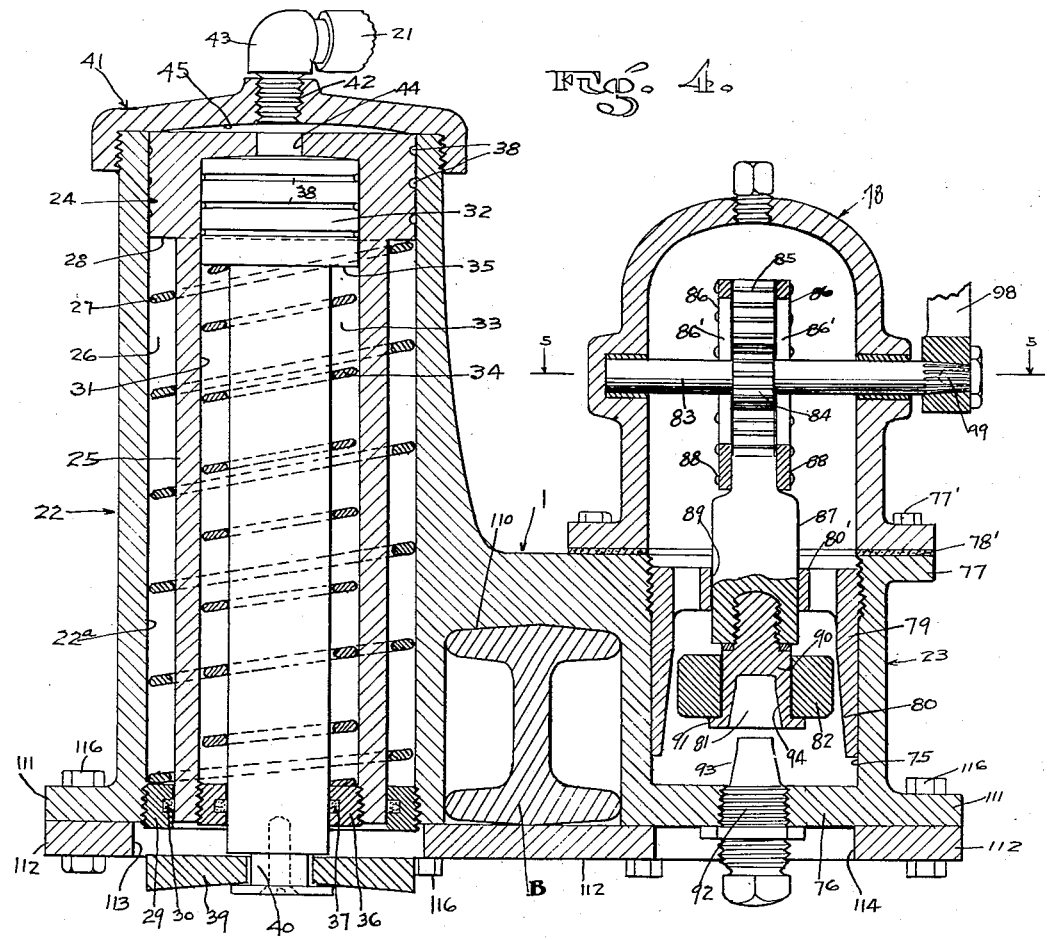
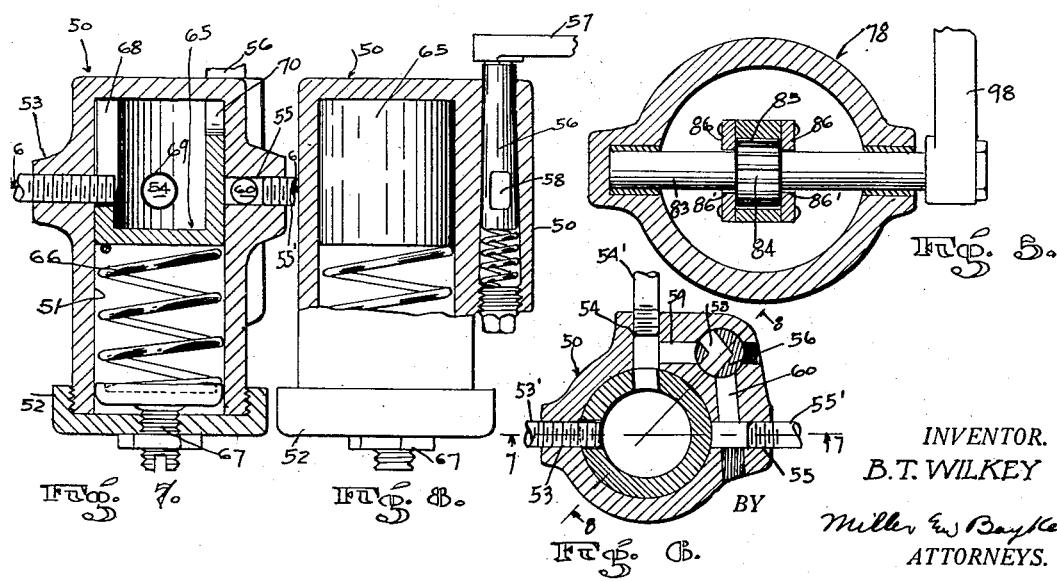
INVENTOR.
B. T. WILKEY
BY
Miller & Bayken
ATTORNEYS.

Patented June 3, 1930

1,760,891

UNITED STATES PATENT OFFICE

B. TAYLOR WILKEY, OF NOGALES, ARIZONA

COMBINED FOUR-WHEEL JACK AND SHOCK ABSORBER

Application filed July 23, 1927. Serial No. 207,897.

This invention has for its purpose the provision of a jack and shock absorber, for motor vehicles or trailers, which for various reasons is combined into a unit for mounting.

The obvious advantages of thus mounting an hydraulic jack and an hydraulic shock absorber as a unit may be summarized as follows:—

First—The jack and absorber may be mounted on opposite sides of the axle in the same line position. With separate mountings it is evident that there must be two positions on each end of each axle for said mountings and while this may be accomplished in some cases it is manifestly much more convenient to have them both in the same unit.

Second—By using a single unit mounting it may be placed outside the channels of the chassis which brings the weight nearer the wheel and decreases the bending moment on the axle.

Third—The workmanlike appearance and unobtrusiveness of a single mounting makes the "tout ensemble" of the car more in keeping with the present day models.

One of the most obvious advantages of my invention resides in the fact that in case of broken front spring my device acts as an emergency stay brace for the front axle.

Some very serious accidents are caused when the front spring of a motor vehicle, particularly heavy stages, breaks and allows the front axle to fall back out of alignment. This situation demands quick action by the driver, but in most cases he is helpless because the wheel falling back has jammed the steering apparatus. My device is so constructed that it will hold the axle in alignment until the car is brought to a stop and any chance of an accident is averted.

Another advantage occurs in the 4-wheel mounting. From such a mounting it is possible to jack up any or all the wheels no matter what the position of the car is. And by having a rigid mounting such as I provide there is no danger or possibility of the car, even though jacked up at an angle, ever sliding off and causing injury or damage.

A further advantage lies in the fact that by thus mounting my device on the axle instead of the chassis I have actually lowered the center of gravity, making for easier steering and more traction and at the same time have provided an "unsprung weight". By "unsprung weight" is meant the fact that the cylinder is fixed to the axle and not the chassis.

A further advantage resides in the provision of a device that is both a shock and rebound absorber and is so designed as to allow the small flexings of the springs, due to the minor unevenness of the road bed to pass unimpeded.

A still further advantage lies in the remote control of the 4 jacks from the driver's compartment, which permits of jacking up any wheel without moving from the driver's seat.

And finally the structural features provide a device that has no points of lubrication, consequently no exposed wearing parts, is simple in design and therefore economical for manufacturing purposes.

With the foregoing points in mind and any subsequent points that may be developed in a more detailed description, reference is now had to the drawings in which—

Fig. 1 shows a top plan of an automobile chassis with my devices in place,

Fig. 2 shows a fragmentary enlarged view on line 2—2 of Fig. 1.

Fig. 3 shows a fragmentary greatly enlarged view on line 3—3 of Fig. 1,

Fig. 4 shows an enlarged section on line 4—4 of Fig. 1,

Fig. 5 shows a section on line 5—5 of Fig. 4,

Fig. 6 is a section of the safety release valve on line 6—6 of Fig. 7,

Fig. 7 is a section of same on line 7—7 of Fig. 6,

Fig. 8 is a section of same on line 8—8 of Fig. 6.

In Fig. 1 is shown an automobile chassis generally designated A provided with a front axle B and a rear axle housing C.

Mounted on the front axle B outside the channel members D are two of my devices designated in their entirety by the numeral 1. Similarly mounted on the rear axle housing are two more units designated 2. It is to be understood that the mounting is not necessarily outside the channel member D, but preferably so; and that in some cases it will be compulsory to put the device inside the channel members.

To control the jacks individually I have provided a system of control from the driver's compartment which consists of a pump 10 mounted on the small auxiliary shaft of the transmission, which is usually provided in cars nowadays as they are manufactured, or in case there is no auxiliary shaft I may take the oil from the regular oil pump on the engine or make a suitable connection from the pump shaft for an auxiliary oil pump. Leading to pump 10 is an oil line 11 from a supply tank 12. The pump 10 draws oil from the supply tank 12 and forces it through a check valve 13 into a safety valve 14. From 14 it passes into a standard 4-way valve 15 which is controlled by handle 16. By manipulating the handle 16 the fluid may be sent into any one of the pipes 17, 18, 19 or 20 as desired, which pipes in turn lead to flexible tubes 21 and the tubes lead to the jack compartment 22.

Opposite the jack compartment is another compartment 23 into which is fitted the mechanism for a shock absorber.

Into compartment 22 which is formed into a cylinder 22$^a$ is fitted a piston generally designated 24, which piston is provided with a skirt 25 the major portion of the lower part of said skirt being cut away to provide an annular space 26 into which space a spring 27 (preferably flat) is fitted, one end of said spring bearing against the shoulder 28 and the other end being held by a screw threaded plate 29 fitted into the lower end of the cylinder 22$^a$, which plate in turn is formed to receive the lower end of the skirt 25. In plate 29 a suitable packing ring 30 is provided to prevent leakage. Within the piston 24 there is provided a second cylinder 31 which contains a second piston 32 which piston is also turned down to provide an annular space 33 to receive a spring 34 the upper end of which bears against the shoulder 35 provided in the piston 32 while the lower end bears against a plate 36 which is screw threaded into the lower end of the cylinder 31. Plate 36 is also provided with a suitable packing ring 37 to prevent leakage.

Suitable oil rings 38 are provided in the piston heads while on the lower end of piston 32 is mounted a shoe 39 suitably fastened thereto as shown at 40.

The upper end of compartment 22 is closed by a screw threaded cap 41 which is provided with a screw threaded opening 42 adapted to receive the incoming pipe 43 which in turn connects with the flexible coupling tube 21. This completes the connection to the 4-way valve and source of supply. In the top of piston 24 is provided an opening 44, while above the piston head a small domed space 45 is provided to permit the pressure to bear upon the full surface of piston 24 before flowing through the opening 44 and bearing upon the second piston 32.

In operation the pressure is sent in through the line 21 and bears simultaneously upon both pistons. As soon as the pressure overcomes the spring tension the pistons commence to slide out in a detelescoping movement until the shoe 39 comes in contact with the ground. At this point the car commences to raise and can be raised until everything is clear, where it is held until ready to be lowered.

To permit the jack to telescope and return to its normal position a second safety release designated 14 in Fig. 1 is provided and is best shown in Figs. 6, 7 and 8.

It consists of a casing 50 the inner part of which is formed into a cylinder 51 one end of which is closed by the casing the other end being closed by a screw threaded cap 52.

The casing 50 is provided with openings 53, 54 and 55. Into opening 53 is fitted a pipe 53′ which comes from the pump 10 after passing through the check valve 13. Opening 54 receives pipe 54′ which pipe leads to the standard four-way valve, no detail of which is shown since any means for deflecting flow in any one of 4 ways can be utilized. Opening 55 takes pipe 55′ which is the return pipe and leads the fluid back into the supply tank 12 upon turning the taper plug 56 by the handle 57 until the opening 58 lines up with the passages 59 and 60 drilled in the casing 50. This by-pass release is used to lower the car and permit the jack to return to normal position. There is however still another function of the safety release valve.

When the fluid is forced by the pump into the cylinder of the jack, the driver has no way of telling when the jack is fully extended. Therefore to avoid any damage that might be caused by working the pump against a non-movable piston a safety pass is provided.

Within the cylinder 51 an inverted cup-shaped piston 65 is fitted which is held in normal position by a spring 66 which is adjustable as shown at 67. A slot 68 is cut in one side wall of the piston 65 into which the end of pipe 53 extends. This serves as a guide and keeps the cup shaped piston from rotating thus forcing the opening 69 in the piston to coincide with the opening 54 in the casing as also the opening 70 in the piston to coincide with the opening 55 in the casing when the piston 65 due to excessive pressure is forced down against the spring 66.

In operation the sequence is as follows:— Normally the fluid enters from pipe 53′ and flows out through pipe 54′ as shown in Fig.

8. When the jack for any reason becomes fully extended an excessive pressure would be set up which would depress the piston 65 and close the opening 54, thus shutting off the line to the jack. The same operation by continuing would bring into coincidence the openings 70 and 55 which opens a pass directly from the pump 10 to the tank 12 and relieves any pressure instantly and automatically.

The compartment 23 of said mounting is formed into a cylinder 75 the lower end of which is closed as shown at 76. The top part of the cylinder is equipped with a flange 77 adapted to receive the top part generally designated 78, a gasket 78' serves to make the joint leak-proof while cap screws 77' hold the part 78 to the flange 77. Into the cylinder 75 is fitted a sleeve 79 having inner tapered walls as shown at 80 and a spider portion 80' at the top thereof.

The walls of the sleeve 79 may be solid or cut away into tapered fingers. If cut away into fingers the piston 82 is correspondingly shaped. Suitably mounted in the upper part 78 is a shaft 83 which carries a small pinion gear 84, which gear in turn meshes with a rack 85. Said rack, is carried by plates 86, which plates are slotted as at 86' to receive the shaft 83 and serve as a means to keep the gear 84 in mesh with the rack 85. These plates 86 are in turn connected to the top of rod 87 as shown at 88, which rod passes through an opening 89 in the spider 80'.

To permit of small movements of the rod 87 without causing the piston 82 to move, a screw threaded end piece 90 of smaller diameter than the rod 87 is attached to the end of the rod. By making the piece 90 of greater length than the thickness of the piston and providing an outer head 91 it is apparent that the piston, which is loosely mounted on said piece may allow the shaft 87 to make small movement up and down without offering any impediment, after the cylinder has been filled with a suitable fluid.

In the bottom wall 76 of the cylinder 75 is mounted an adjustable stud 92, which is tapered as at 93 to fit into a correspondingly tapered hole 94 in the piece 90. This taper stud is capable of vertical adjustments and variations in tapering to cause a cushioning effect as the piston descends towards a bottom position.

In operation the shaft 83 is provided with an arm 98 which arm is equipped with multiple taper splines 99 to permit of fine angular adjustments.

The arm 98 is provided with a flexible disk 100 at its outer end suitably connected thereto as shown at 101. The edge of said disk is suitably held at two points such as 102 by a yokelike casting 103 which is attached as at 105 to the channel D of the chassis A. This connection provides a vertical flexibility but due to the rigidity of the arm 98 in not being able to turn horizontally it also provides a means of keeping the axle in alignment in case of a broken spring.

To mount the device, the axle B is fitted into the opening 110 which lies between the compartments 22 and 23, a plate 112 shaped to fit the contour of flange 111 is provided and equipped with openings 113 and 114, to permit of the jack operating and of adjusting the shock absorber cushioning effect respectively. The plate 112 is held against the flange 111 and the axle B by bolts 116.

This type of mounting permits of placing the jack and shock absorber in the same line on opposite sides of the axle, also of using one plate to hold them.

The foregoing description applies to the embodiment as shown in the accompanying drawings, but since the application of my idea may be varied and modified without departing from the scope of the description nor the purview of the claims I reserve this right to such modification and refinement.

I claim:

1. As a new article of manufacture a block of metal having two spaced cylinders, one of said cylinders being adapted for use as a jack, the other being adapted for use as a shock absorber, said block of metal being also provided with a bridge piece integrally connecting the cylinders each at an intermediate point in their length, and a plate bolted to the ends of the cylinders adapted for clamping a vehicle axle to the bridge piece.

2. In a vehicle having an axle, a casting mounted on said axle said casting comprising two counter balancing cylinders on opposite sides of said axle one of said cylinders being adapted to receive a jack and the other a shock absorber, a bridge member connecting both cylinders resting on top of the axle, and a plate extending across underneath the axle secured to the ends of both cylinders.

3. In a vehicle having an axle a cylinder adapted to receive a jack positioned vertically in front of said axle, a second cylinder adapted to receive a shock absorber positioned vertically behind said axle substantially in line with the first mentioned cylinder, a bridge piece joining said cylinders, serving also as the support for said cylinders on said axle, and means clamping said bridge piece to the axle.

B. TAYLOR WILKEY.